US012561225B2

(12) United States Patent
Eberlein et al.

(10) Patent No.: US 12,561,225 B2
(45) Date of Patent: Feb. 24, 2026

(54) INTELLIGENT DEVOPS RECOMMENDATION OF INSIGHTS ACROSS SOFTWARE APPLICATIONS AND LANDSCAPES

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 18/488,159

(22) Filed: Oct. 17, 2023

(65) Prior Publication Data

US 2025/0123946 A1 Apr. 17, 2025

(51) Int. Cl.
| | |
|---|---|
| *G06F 11/3604* | (2025.01) |
| *G06F 8/77* | (2018.01) |
| *G06N 20/00* | (2019.01) |

(52) U.S. Cl.
CPC ............ *G06F 11/3608* (2013.01); *G06F 8/77* (2013.01); *G06N 20/00* (2019.01)

(58) Field of Classification Search
CPC .... G06F 11/3608; G06F 8/77; G06F 11/0793; G06F 11/302; G06F 11/079; G06N 20/00
USPC ......................................... 717/101
See application file for complete search history.

(56) References Cited

U.S. PATENT DOCUMENTS

| | | | | |
|---|---|---|---|---|
| 6,662,357 | B1 * | 12/2003 | Bowman-Amuah .. | G06Q 10/06 |
| | | | | 717/120 |
| 7,523,142 | B2 | 4/2009 | Driesen et al. | |

| | | | |
|---|---|---|---|
| 7,657,575 | B2 | 2/2010 | Eberlein et al. |
| 7,720,992 | B2 | 5/2010 | Brendle et al. |
| 7,739,387 | B2 | 6/2010 | Eberlein et al. |
| 7,971,209 | B2 | 6/2011 | Eberlein et al. |
| 8,126,919 | B2 | 2/2012 | Eberlein |

(Continued)

FOREIGN PATENT DOCUMENTS

| | | |
|---|---|---|
| WO | WO 2021243342 | 12/2021 |

OTHER PUBLICATIONS

Wiedemann, Anna, et al. "Understanding how DevOps aligns development and operations: a tripartite model of intra-IT alignment." European Journal of Information Systems 29.5 (2020): pp. 458-473. (Year: 2020).*

(Continued)

*Primary Examiner* — Satish Rampuria
(74) *Attorney, Agent, or Firm* — Fish & Richardson P.C.

(57) ABSTRACT

In an implementation of a computer-implemented method: to create extracted data records, an extract filter is instructed to extract relevant data records from log messages of two runs of a software pipeline. To create diff records using the extracted data records, a diff filter is instructed to compare and identify differences in messages between the two runs, where the diff records are amended with labeled data status information of a software pipeline run the extracted data records have been taken from. A recommendation engine is instructed to execute a machine-learning model training with the diff records. The recommendation engine is called to analyze the diff records for a failure-indicator. A determination is made that a failure causing the failure-indicator has been corrected in a later run of the software pipeline. A change is identified in a configuration or version of a software application associated with a correction. A failure-indicator-solution combination is generated.

20 Claims, 7 Drawing Sheets

(56) References Cited

U.S. PATENT DOCUMENTS

| | | | |
|---|---|---|---|
| 8,225,303 | B2 | 7/2012 | Wagner et al. |
| 8,291,038 | B2 | 10/2012 | Driesen |
| 8,301,610 | B2 | 10/2012 | Driesen et al. |
| 8,356,010 | B2 | 1/2013 | Driesen |
| 8,375,130 | B2 | 2/2013 | Eberlein et al. |
| 8,380,667 | B2 | 2/2013 | Driesen |
| 8,392,573 | B2 | 3/2013 | Lehr et al. |
| 8,402,086 | B2 | 3/2013 | Driesen et al. |
| 8,407,297 | B2 | 3/2013 | Schmidt-Karaca et al. |
| 8,434,060 | B2 | 4/2013 | Driesen et al. |
| 8,467,817 | B2 | 6/2013 | Said et al. |
| 8,479,187 | B2 | 7/2013 | Driesen et al. |
| 8,560,876 | B2 | 10/2013 | Driesen et al. |
| 8,572,369 | B2 | 10/2013 | Schmidt-Karaca et al. |
| 8,604,973 | B2 | 12/2013 | Schmidt-Karaca et al. |
| 8,612,406 | B1 | 12/2013 | Said et al. |
| 8,631,406 | B2 | 1/2014 | Driesen et al. |
| 8,645,483 | B2 | 2/2014 | Odenheimer et al. |
| 8,706,772 | B2 | 4/2014 | Hartig et al. |
| 8,751,573 | B2 | 6/2014 | Said et al. |
| 8,762,929 | B2 | 6/2014 | Driesen |
| 8,793,230 | B2 | 7/2014 | Engelko et al. |
| 8,805,986 | B2 | 8/2014 | Driesen et al. |
| 8,875,122 | B2 | 10/2014 | Driesen et al. |
| 8,880,486 | B2 | 11/2014 | Driesen et al. |
| 8,924,384 | B2 | 12/2014 | Driesen et al. |
| 8,972,934 | B2 | 3/2015 | Driesen et al. |
| 8,996,466 | B2 | 3/2015 | Driesen |
| 9,003,356 | B2 | 4/2015 | Driesen et al. |
| 9,009,105 | B2 | 4/2015 | Hartig et al. |
| 9,026,502 | B2 | 5/2015 | Driesen et al. |
| 9,031,910 | B2 | 5/2015 | Driesen |
| 9,032,406 | B2 | 5/2015 | Eberlein |
| 9,069,984 | B2 | 6/2015 | Said et al. |
| 9,077,717 | B2 | 7/2015 | Said et al. |
| 9,122,669 | B2 | 9/2015 | Demant et al. |
| 9,137,130 | B2 | 9/2015 | Driesen et al. |
| 9,182,979 | B2 | 11/2015 | Odenheimer et al. |
| 9,189,226 | B2 | 11/2015 | Driesen et al. |
| 9,223,985 | B2 | 12/2015 | Eberlein et al. |
| 9,229,707 | B2 | 1/2016 | Borissov et al. |
| 9,256,840 | B2 | 2/2016 | Said et al. |
| 9,262,763 | B2 | 2/2016 | Peter et al. |
| 9,336,227 | B2 | 5/2016 | Eberlein et al. |
| 9,348,929 | B2 | 5/2016 | Eberlein |
| 9,361,093 | B2 | 6/2016 | Meissner et al. |
| 9,367,199 | B2 | 6/2016 | Klemenz et al. |
| 9,372,685 | B1 | 6/2016 | Luettge et al. |
| 9,436,724 | B2 | 9/2016 | Driesen et al. |
| 9,519,675 | B2 | 12/2016 | Specht et al. |
| 9,639,448 | B2 | 5/2017 | Gebhard et al. |
| 9,652,214 | B1 | 5/2017 | Eberlein |
| 9,652,744 | B2 | 5/2017 | Eberlein et al. |
| 9,672,140 | B1 | 6/2017 | Eberlein |
| 9,678,740 | B2 | 6/2017 | Heine et al. |
| 9,703,554 | B2 | 7/2017 | Eberlein et al. |
| 9,720,994 | B2 | 8/2017 | Driesen et al. |
| 9,721,116 | B2 | 8/2017 | Driesen et al. |
| 9,740,476 | B2 | 8/2017 | Eberlein et al. |
| 9,767,424 | B2 | 9/2017 | Biewald et al. |
| 9,830,138 | B2 | 11/2017 | Said et al. |
| 9,836,299 | B2 | 12/2017 | Eberlein et al. |
| 9,854,045 | B2 | 12/2017 | Said et al. |
| 9,858,309 | B2 | 1/2018 | Eberlein et al. |
| 9,898,279 | B2 | 2/2018 | Eberlein et al. |
| 9,898,494 | B2 | 2/2018 | Eberlein et al. |
| 9,898,495 | B2 | 2/2018 | Eberlein et al. |
| 9,927,992 | B2 | 3/2018 | Driesen et al. |
| 10,013,337 | B2 | 7/2018 | Eberlein et al. |
| 10,013,472 | B2 | 7/2018 | Driesen et al. |
| 10,025,568 | B2 | 7/2018 | Mayer et al. |
| 10,061,788 | B2 | 8/2018 | Said et al. |
| 10,120,886 | B2 | 11/2018 | Eberlein et al. |
| 10,157,052 | B2 | 12/2018 | Eberlein et al. |
| 10,185,552 | B2 | 1/2019 | Eberlein et al. |
| 10,191,733 | B2 | 1/2019 | Driesen et al. |
| 10,268,472 | B2 | 4/2019 | Eberlein et al. |
| 10,268,692 | B2 | 4/2019 | Mayer et al. |
| 10,270,743 | B2 | 4/2019 | Eberlein |
| 10,291,704 | B2 | 5/2019 | Eberlein et al. |
| 10,296,324 | B2 | 5/2019 | Burkhardt et al. |
| 10,298,591 | B2 | 5/2019 | Eberlein et al. |
| 10,303,665 | B2 | 5/2019 | Engelko et al. |
| 10,419,445 | B2 | 9/2019 | Eberlein et al. |
| 10,437,795 | B2 | 10/2019 | Eberlein et al. |
| 10,452,646 | B2 | 10/2019 | Schlarb et al. |
| 10,482,080 | B2 | 11/2019 | Auer et al. |
| 10,496,401 | B2 | 12/2019 | Eberlein et al. |
| 10,505,832 | B2 | 12/2019 | Eberlein et al. |
| 10,523,662 | B2 | 12/2019 | Eberlein |
| 10,534,585 | B1 | 1/2020 | Eberlein et al. |
| 10,536,461 | B2 | 1/2020 | De Boer et al. |
| 10,642,609 | B1 | 5/2020 | Eberlein et al. |
| 10,656,933 | B2 | 5/2020 | Radermacher et al. |
| 10,659,449 | B2 | 5/2020 | Eberlein |
| 10,673,962 | B2 | 6/2020 | Mueller et al. |
| 10,684,868 | B2 | 6/2020 | Driesen et al. |
| 10,684,999 | B2 | 6/2020 | Mayer et al. |
| 10,685,007 | B2 | 6/2020 | Eberlein et al. |
| 10,686,882 | B2 | 6/2020 | Eberlein et al. |
| 10,693,989 | B2 | 6/2020 | Eberlein et al. |
| 10,700,949 | B1 | 6/2020 | Eberlein |
| 10,740,315 | B2 | 8/2020 | Birn et al. |
| 10,762,075 | B2 | 9/2020 | Eberlein et al. |
| 10,789,220 | B2 | 9/2020 | Mayer et al. |
| 10,853,693 | B2 | 12/2020 | Eberlein et al. |
| 10,871,962 | B2 | 12/2020 | Burkhardt et al. |
| 10,891,217 | B2 | 1/2021 | Eberlein et al. |
| 10,915,551 | B2 | 2/2021 | Hauck et al. |
| 11,036,754 | B2 | 6/2021 | Specht et al. |
| 11,050,820 | B2 | 6/2021 | Odenheimer et al. |
| 11,106,816 | B2 | 8/2021 | Eberlein et al. |
| 11,119,883 | B1 | 9/2021 | Eberlein et al. |
| 11,206,305 | B1 | 12/2021 | Eberlein et al. |
| 11,232,126 | B2 | 1/2022 | Meissner et al. |
| 11,237,821 | B1 | 2/2022 | Hoeft et al. |
| 11,249,812 | B2 | 2/2022 | Eberlein et al. |
| 11,269,620 | B1 | 3/2022 | Hoeft et al. |
| 11,269,717 | B2 | 3/2022 | Eberlein et al. |
| 11,347,873 | B2 | 5/2022 | Eberlein |
| 11,368,547 | B2 | 6/2022 | Eberlein |
| 11,379,217 | B1 | 7/2022 | Eberlein et al. |
| 11,409,719 | B2 | 8/2022 | Eberlein |
| 11,418,550 | B1 | 8/2022 | Eberlein et al. |
| 11,438,437 | B1 | 9/2022 | Eberlein et al. |
| 11,463,309 | B1 | 10/2022 | Eberlein et al. |
| 11,537,364 | B2 | 12/2022 | Eberlein et al. |
| 11,551,141 | B2 | 1/2023 | Driesen |
| 11,561,836 | B2 | 1/2023 | Eberlein et al. |
| 11,687,670 | B2 | 6/2023 | Eberlein et al. |
| 11,693,945 | B2 | 7/2023 | Engler et al. |
| 11,704,430 | B2 | 7/2023 | Eberlein et al. |
| 11,709,658 | B2 | 7/2023 | Eberlein et al. |
| 11,734,160 | B2 | 8/2023 | Eberlein et al. |
| 11,782,689 | B1* | 10/2023 | Costello .............. H04L 41/122 |
| | | | 717/177 |
| 2005/0114829 | A1* | 5/2005 | Robin .................. G06Q 10/06 |
| | | | 717/101 |
| 2009/0106371 | A1 | 4/2009 | Schmidt-Karaca et al. |
| 2009/0106372 | A1 | 4/2009 | Schmidt-Karaca et al. |
| 2009/0150479 | A1 | 6/2009 | Eberlein et al. |
| 2009/0172110 | A1 | 7/2009 | Eberlein et al. |
| 2011/0154445 | A1 | 6/2011 | Schmidt-Karaca et al. |
| 2012/0136839 | A1 | 5/2012 | Eberlein et al. |
| 2013/0085810 | A1 | 4/2013 | Driesen et al. |
| 2013/0144918 | A1 | 6/2013 | Said et al. |
| 2013/0166415 | A1 | 6/2013 | Odenheimer et al. |
| 2013/0166416 | A1 | 6/2013 | Eberlein |
| 2013/0324201 | A1 | 12/2013 | Eberlein et al. |
| 2013/0325672 | A1 | 12/2013 | Odenheimer et al. |
| 2013/0339488 | A1 | 12/2013 | Eberlein et al. |
| 2014/0019429 | A1 | 1/2014 | Driesen et al. |
| 2014/0025441 | A1 | 1/2014 | Eberlein et al. |
| 2014/0047319 | A1 | 2/2014 | Eberlein |

(56)                    References Cited

U.S. PATENT DOCUMENTS

| | | | |
|---|---|---|---|
| 2014/0149158 | A1 | 5/2014 | Odenheimer et al. |
| 2014/0164963 | A1 | 6/2014 | Klemenz et al. |
| 2014/0181145 | A1* | 6/2014 | Kamsamohideen ........................ G06F 11/0793 707/776 |
| 2014/0372981 | A1 | 12/2014 | Said et al. |
| 2015/0180729 | A1 | 6/2015 | Said et al. |
| 2015/0188890 | A1 | 7/2015 | Said et al. |
| 2015/0220576 | A1 | 8/2015 | Eberlein |
| 2015/0220591 | A1 | 8/2015 | Eberlein et al. |
| 2015/0222665 | A1 | 8/2015 | Eberlein et al. |
| 2015/0378725 | A1 | 12/2015 | Eberlein et al. |
| 2016/0026698 | A1 | 1/2016 | Eberlein et al. |
| 2016/0063050 | A1 | 3/2016 | Schoen et al. |
| 2016/0098253 | A1 | 4/2016 | Hutzel et al. |
| 2016/0127325 | A1 | 5/2016 | Odenheimer et al. |
| 2016/0179497 | A1 | 6/2016 | Driesen |
| 2017/0161291 | A1 | 6/2017 | Specht et al. |
| 2017/0161511 | A1 | 6/2017 | Eberlein et al. |
| 2017/0171233 | A1 | 6/2017 | Odenheimer et al. |
| 2017/0235848 | A1* | 8/2017 | Van Dusen ........ G06Q 30/0201 705/12 |
| 2017/0329505 | A1 | 11/2017 | Richter et al. |
| 2017/0351442 | A1 | 12/2017 | Specht et al. |
| 2018/0041568 | A1 | 2/2018 | Eberlein |
| 2018/0095743 | A1 | 4/2018 | Specht et al. |
| 2018/0121236 | A1 | 5/2018 | Odenheimer et al. |
| 2018/0268154 | A1 | 9/2018 | Specht et al. |
| 2018/0300332 | A1 | 10/2018 | Odenheimer et al. |
| 2019/0007420 | A1 | 1/2019 | Eberlein et al. |
| 2019/0129985 | A1 | 5/2019 | Schlarb et al. |
| 2019/0238426 | A1 | 8/2019 | Eberlein |
| 2019/0340260 | A1 | 11/2019 | Eberlein et al. |
| 2019/0354600 | A1 | 11/2019 | Driesen et al. |
| 2019/0377820 | A1 | 12/2019 | Kruempelmann et al. |
| 2020/0175336 | A1 | 6/2020 | Eberlein et al. |
| 2020/0225940 | A1 | 7/2020 | Eberlein et al. |
| 2020/0257673 | A1 | 8/2020 | Auer et al. |
| 2020/0351367 | A1 | 11/2020 | Eberlein |
| 2021/0089384 | A1 | 3/2021 | Eberlein et al. |
| 2021/0173626 | A1 | 6/2021 | Kruempelmann et al. |
| 2021/0182108 | A1 | 6/2021 | Eberlein et al. |
| 2021/0182251 | A1 | 6/2021 | Eberlein et al. |
| 2021/0240450 | A1 | 8/2021 | Eberlein et al. |
| 2021/0328980 | A1 | 10/2021 | Eberlein |
| 2021/0385136 | A1 | 12/2021 | Misch et al. |
| 2022/0012361 | A1 | 1/2022 | Eberlein et al. |
| 2022/0107802 | A1* | 4/2022 | Rao ........................ G06F 16/907 |
| 2022/0108206 | A1 | 4/2022 | Driesen et al. |
| 2022/0217208 | A1 | 7/2022 | Eberlein et al. |
| 2022/0292420 | A1 | 9/2022 | Eberlein et al. |
| 2022/0300490 | A1 | 9/2022 | Eberlein et al. |
| 2022/0335031 | A1 | 10/2022 | Eberlein et al. |
| 2022/0391305 | A1 | 12/2022 | Eberlein et al. |
| 2022/0398258 | A1 | 12/2022 | Eberlein et al. |
| 2022/0405193 | A1* | 12/2022 | Ashok ................... G06F 11/004 |
| 2023/0041514 | A1 | 2/2023 | Eberlein et al. |
| 2023/0068439 | A1 | 3/2023 | Hoeft et al. |
| 2023/0119834 | A1 | 4/2023 | Driesen |
| 2023/0169528 | A1 | 6/2023 | Eberlein et al. |
| 2023/0195422 | A1 | 6/2023 | Eberlein et al. |
| 2023/0195443 | A1 | 6/2023 | Eberlein et al. |
| 2023/0252009 | A1 | 8/2023 | Hauck et al. |
| 2023/0315723 | A1 | 10/2023 | Eberlein et al. |
| 2023/0333847 | A1* | 10/2023 | Seery ........................ G06F 8/71 |

OTHER PUBLICATIONS

Shahin, Mojtaba, et al. "Adopting continuous delivery and deployment: Impacts on team structures, collaboration and responsibilities." Proceedings of the 21st international conference on evaluation and assessment in software engineering. 2017.pp. 1-10. (Year: 2017).*

Wiedemann, Anna, Manuel Wiesche, and Helmut Krcmar. "Integrating development and operations in cross-functional teams-toward a devops competency model." Proceedings of the 2019 on Computers and People Research Conference. 2019.pp. 14-19. (Year: 2019).*

Erich, Floris, Chintan Amrit, and Maya Daneva. "Cooperation between software development and operations: a literature review." The 8th ACM/IEEE International Symposium on Empirical Software Engineering and Measurement. ACM, Torino. 2014. pp. 1-5 (Year: 2014).*

Cois, Constantine Aaron, Joseph Yankel, and Anne Connell. "Modern DevOps: Optimizing software development through effective system interactions." 2014 IEEE international professional communication conference (IPCC). IEEE, 2014. pp. 1-7 (Year: 2014).*

Mainali, Kiran, et al. "Discovering DataOps: a comprehensive review of definitions, use cases, and tools." Data Analytics 2021 The Tenth International Conference on Data Analytics. 2021. pp. 61-69 (Year: 2021).*

Extended European Search Report in European Appln. No. 24204958.3, mailed on Mar. 26, 2025, 10 pages.

U.S. Appl. No. 17/938,101, Eberlein et al., filed Oct. 5, 2022.

U.S. Appl. No. 17/979,423, Eberlein et al., filed Nov. 2, 2022.

U.S. Appl. No. 17/983,045, Eberlein, filed Nov. 8, 2022.

U.S. Appl. No. 18/048,578, Eberlein et al., filed Oct. 21, 2022.

U.S. Appl. No. 18/191,343, Eberlein et al., filed Mar. 28, 2023.

U.S. Appl. No. 18/209,234, Eberlein, filed Jun. 13, 2023.

U.S. Appl. No. 18/298,634, Eberlein et al., filed Apr. 11, 2023.

U.S. Appl. No. 18/298,661, Eberlein, filed Apr. 11, 2023.

U.S. Appl. No. 18/327,370, Eberlein et al., filed Jun. 1, 2023.

* cited by examiner

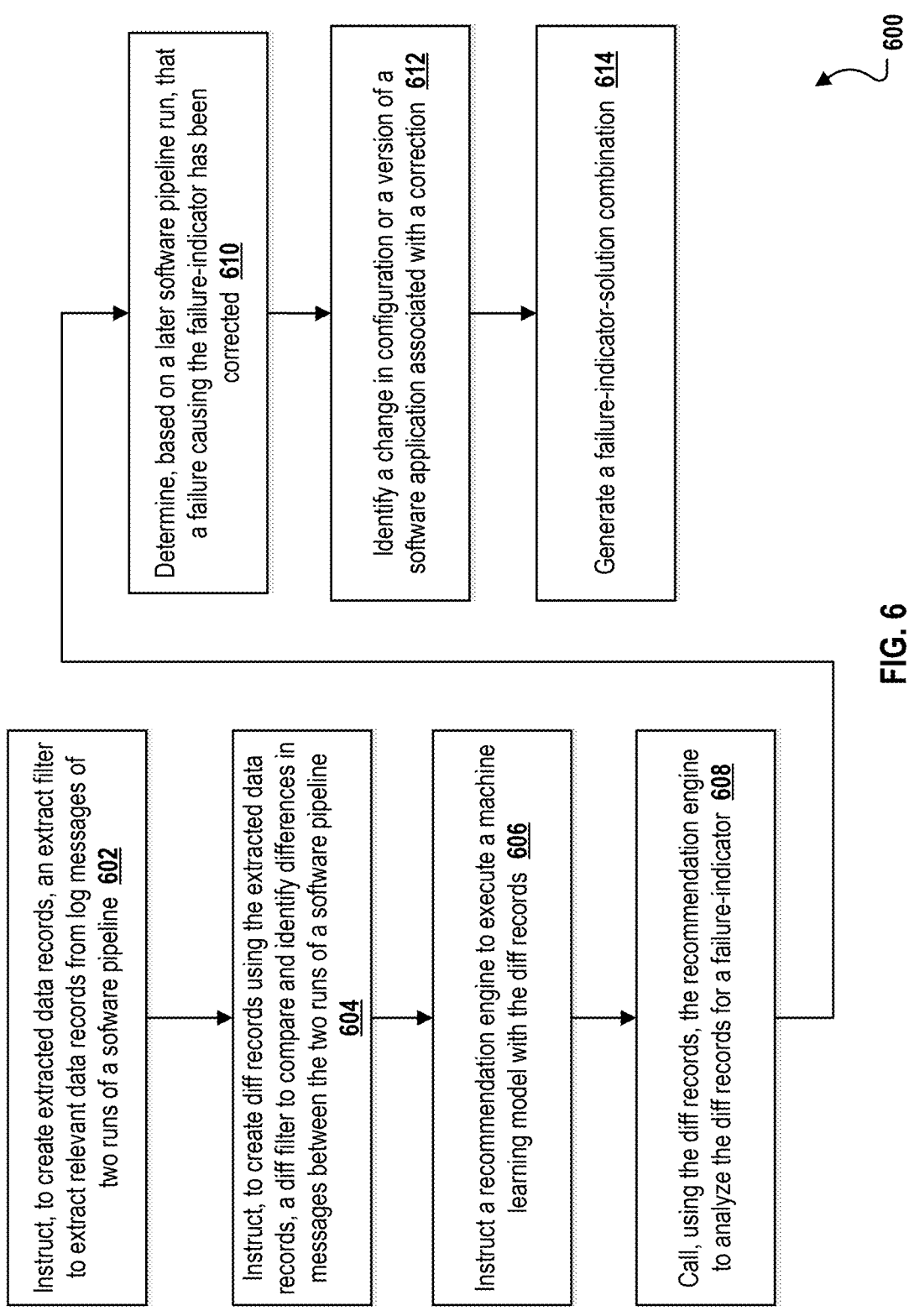

Instruct, to create extracted data records, an extract filter to extract relevant data records from log messages of two runs of a sofware pipeline 602

Instruct, to create diff records using the extracted data records, a diff filter to compare and identify differences in messages between the two runs of a software pipeline 604

Instruct a recommendation engine to execute a machine learning model with the diff records 606

Call, using the diff records, the recommendation engine to analyze the diff records for a failure-indicator 608

Determine, based on a later software pipeline run, that a failure causing the failure-indicator has been corrected 610

Identify a change in configuration or a version of a software application associated with a correction 612

Generate a failure-indicator-solution combination 614

INTELLIGENT DEVOPS RECOMMENDATION OF INSIGHTS ACROSS SOFTWARE APPLICATIONS AND LANDSCAPES

BACKGROUND

Software development and operations (DevOps) is a software engineering methodology which integrates software development teams (Dev) and information technology operations teams (Ops) though collaboration and responsibility sharing. The teams participate together through an entire lifecycle of design, development, and production support. Benefits of DevOps can include, among other things, a more stable production environment, shorter development cycles, faster release cycles, reduced defects, and availability of metrics. In current DevOps, issues, solutions, and actions in one landscape of a delivery pipeline are not communicated to other landscapes to prevent the same issues from occurring there.

SUMMARY

The present disclosure describes intelligent software development and information technology operations (DevOps) recommendation of insights across software applications and landscapes.

In an implementation, a computer-implemented method, comprises: instructing, to create extracted data records, an extract filter to extract relevant data records from log messages of two runs of a software pipeline; instructing, to create diff records using the extracted data records, a diff filter to compare and identify differences in messages between the two runs of a software pipeline, wherein the diff records are amended with labeled data status information of a software pipeline run the extracted data records have been taken from; instructing a recommendation engine to execute a machine-learning model training with the diff records; calling, using the diff records, the recommendation engine to analyze the diff records for a failure-indicator; determining, based on a later run of the software pipeline, that a failure causing the failure-indicator has been corrected; identifying a change in configuration or version of a software application associated with a correction; and generating a failure-indicator-solution combination.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described approach permits analysis of configuration changes and log messages of a software product build, test, and deployment pipeline, as well as production and test logs and monitoring alerts beyond standard metrics such as error message analysis. Second, the described approach permits the system to derive indicators of production failures and identify such indicators in other situations (for example, findings from one product can be used to identify issues in other products). Third, the described approach can identify potential problems in a pipeline run before deployment, which permits developers to analyze a potential problem before it occurs, based on insights other teams had with the same situation. Fourth, the described approach leads to fewer problems with deployment of new versions or changed configurations of a software product, and increases product availability, enhances customer satisfaction, and lowers operational effort for development teams in a DevOps environment.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 6 is a flowchart illustrating an example of a computer-implemented method for intelligent software development and information technology operations (DevOps) recommendation of insights across software applications and landscapes, according to an implementation of the present disclosure.

Like reference numbers and designations in the various drawings indicate like elements.

DETAILED DESCRIPTION

Figure 1:
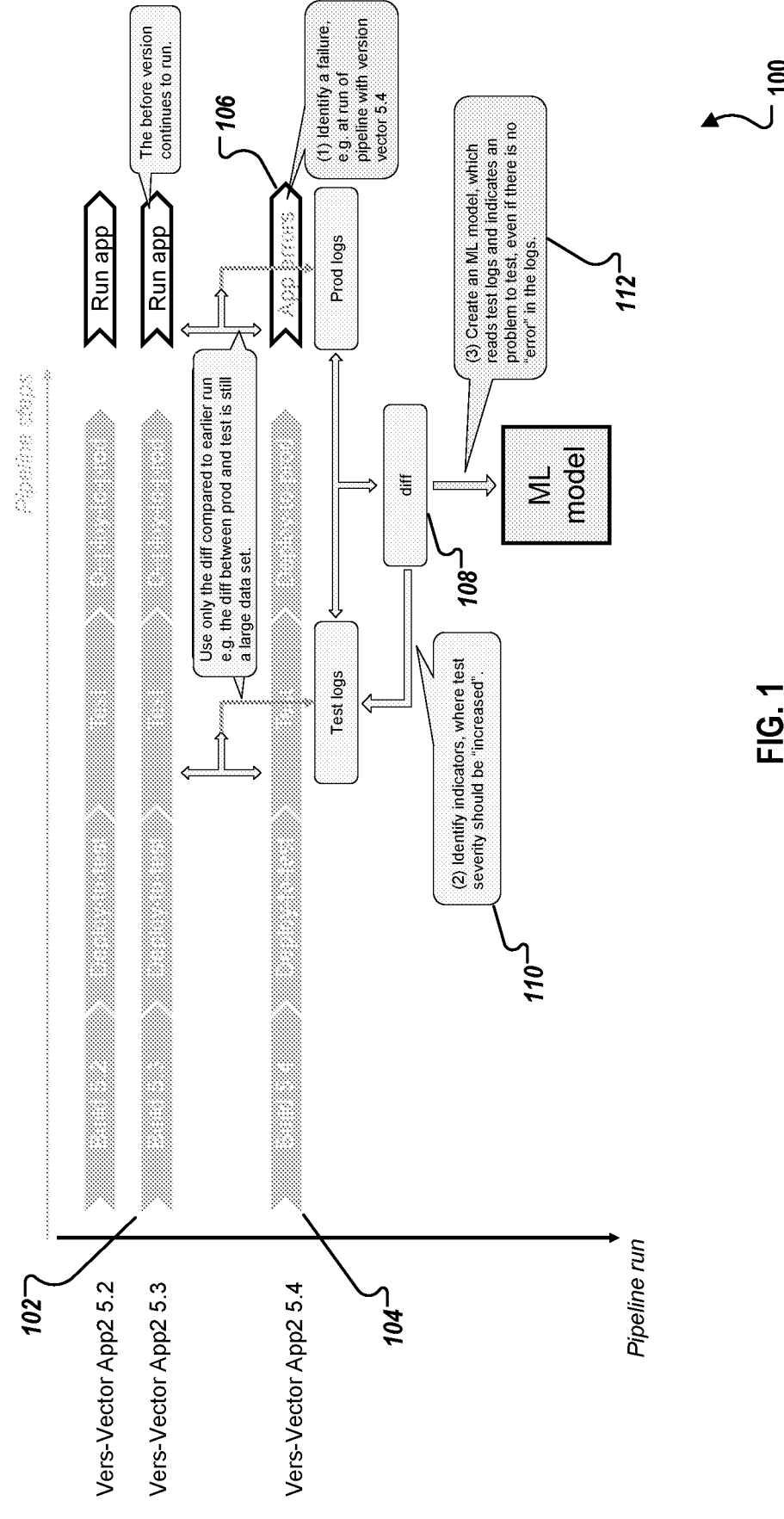
FIG. 1 is a graph illustrating a log comparison of pipeline urns between "Test" and "Prod" (or "Production"), according to an implementation of the present disclosure.

The following detailed description describes intelligent software development and information technology operations (DevOps) recommendation of insights across software applications and landscapes and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Software development and operations (DevOps) is a software engineering methodology which integrates software development teams (Dev) and information technology operations teams (Ops) though collaboration and responsibility sharing. The teams participate together through an entire lifecycle of design, development, and production support. Benefits of DevOps can include, among other things, a more stable production environment, shorter development cycles, faster release cycles, reduced defects, and availability of metrics.

Described is the development of software applications, typically cloud-based applications built with a micro-services architecture and a modern continuous integration and continuous delivery (CI/CD) pipeline. Typically, such software development teams run the DevOps methodology—that is, the software development team not only develops the software application, but also runs the software application in a production environment and takes care of information technology operations. Such CI/CD pipelines typically include a staging (or testing) software landscape and one or more production software landscapes.

Typically, the CI/CD delivery pipelines are designed to frequently deliver small changes (that is, a difference between two software deployments is rather small in terms of version change, configuration change, and/or code change). Every change is tested in testing and propagated to production when no error is found. The teams are not only asked for fast iteration (to enable a fast reaction to any issue found in production) but to also to optimize other service level agreements (SLA)-like service availability. For example, a software application being provided as a service shall not be offline for more than a contractually agreed percentage of time (typically, availability in the range of 99.7% or higher). Therefore, it is crucial to avoid violating SLA contracts by breaking productively running applications with a new deployment.

Software development teams are therefore faced with a dilemma to "deliver quickly" but to still "not to break anything." Changes to code and configurations are tested before delivery to production. But such tests can only cover a certain set of scenarios, as there will always be gaps. Typically, services used in production face higher loads, data volume, more connected users, and more heterogeneous landscapes than a testing landscape can cover due to logistics, time constraints, costs, etc. As such, any additional insight into potential problems/failures and identifying potential problems before they may occur are highly relevant. The described approach elaborates on and leverages insights which can be derived from one software landscape and software application, and which can be transcribed to other software landscapes and software applications using similar building blocks, libraries, etc. In other words, DevOps efficiency can be improved by identifying issues in one software landscape of a CI/CD pipeline and recommending actions for another software landscape to prevent same/similar issues from re-occurring. Furthermore, the described approach can identify issues for one software application and to recommend actions for another software application with the same intention.

In a conventional DevOps methodology, problems and related solution approaches found with one software application can only be transferred to other software application development efforts if different software development teams know about their commonality and communicate issues between each other. In other words, one software development team may find a solution to a problem which occurred in their production software landscape, but the software development team may not be aware, that another software development team has the same configuration and usage of software development building blocks; thus one or more insights are lost for the other software development team. Or a software development team remotely knows about another software development team but are so occupied with solving their own problems, that they do not communicate timely with the other software development team-meaning that valuable time between identifying a problem and implementing a solution can be lost.

Often problems are not detected during testing, but instead occur in production software landscapes due to different usage characteristics. This is because usage between testing and production can vary—typically with higher loads, larger data volumes, and broader usage scope found in production software landscapes when compared to testing software landscapes.

For many components, it is typical to issue warning messages if a situation is nearing a critical limit and to issue an error message when the critical limit has been exceeded (for example, for usage of buffers, cache refresh rate, or size of queues, several critical thresholds are defined, at which warning, or error messages are written, before a software system terminates at some point with a fatal message). Looking at different software landscapes, there can be situations, where a load created in a testing software landscape, which only causes a warning message, translates to a fatal error when confronted with a greater load found in a production software landscape. Therefore, even a warning message in testing may need to be treated as a critical situation if one is aware of a correlation between a certain warning message and to what it will translate to under an increased load in a production software landscape.

Testing software landscapes are resource intensive/costly and are not able to realistically cover all possible software application integration variants and usage options. Specialized software applications are often used for testing, as overall resource expenditure for the testing an add to an overall cost of a service and can reduce or eliminate competitiveness of the service. As a result, there is always a decision made with respect to what a balance should be between what is tested and what not.

Situations which cannot be tested are monitored closely to enable fast reactions in case a situation runs into an error condition. Early indicators of an upcoming problem are embedded in the production software landscape (for example, an escalating level of warning(s) and error messages are logged or more fine-grained threshold supervision is established). Still, such situations are only monitored in a production software landscape and may ultimately lead to a failure that could be prevented if detected earlier or for other similar software applications.

The described approach create a system which can detect failures in production software landscapes, relate the detected failures to one or more indicators in build or test, and using found occurrences of the one or more indicators in other landscapes to warn software developers, that the one or more indicators led to failure in other landscapes.

A described process can be extended to also identify solution-indicators which were used to remove a failure in a production software landscape. When a failure-indicator is found in a landscape, the software developers can then not only be warned that a production software landscape failure may occur, but also be informed about a potential solution to mitigate/eliminate the potential production software landscape failure.

The described approach relies on existing failure reporting systems based on logging and external monitoring. To identify potential failure-indicators and solution-indicators, the described approach prepares information in two steps: First, extracting data records (using an "extract filter") which have a high-likelihood to contain relevant information. In some implementations, data records are in the form of log messages or configuration parameters which contain information about deployed versions and components, error messages, and status information of executed tasks. Second, comparing differences of one pipeline run with an earlier pipeline run (using a "diff filter"). In some implementations, the diff filter compares two runs of a pipeline and identifies messages which are different. In this way, the described approach can derive, for example, "failure-indicator—failure—solution-indicator" data sets.

While a single data set can be used to scan pipeline runs (especially of other software applications), multiple data sets can be used to prepare a machine learning (ML) model. In some implementations, a superset of identified failure-indicator and solution-indicator parameters can be read from a set of pipeline runs of different products. The ML model can be trained with the parameters and failures as labeled data to provide a model, which can be queried with a set of parameters to assess, if the set of parameters will likely lead to a future failure or not. In some implementations, the parameters can include changes to build configuration, changes to used software versions (both direct and indirect consumption), log messages from build and run, and/or values extracted from such log messages.

With the described approach, a certain set of problematic changes and critical situations in build and testing can be identified, before the pipeline updates a production software landscape and can potentially cause a failure. Software developers can be proactively warned to check their software landscapes and adjust—potentially even with a solution recommendation provided by the approach. The described approach allows for transferring insights from one software application to other software applications.

Identifying Failures

Identification of system failure can be based on existing monitoring infrastructure; however, extensions can add a broader and more detailed analysis for better detection of early warning indicators. Failures can be identified as alerts in log messages of the production software landscape, crash dump recordings, service downtime, other service degradation, and/or other alerting events. For a failure, a used software application version and pipeline run which led to the deployment of the configuration needs to be identified (a "version vector of used building blocks").

Identifying Failure-Indicators

The described approach then searches for potential failure-indicators. Focus is on failure-indicators in the "version vector of used building blocks"—the exact pipeline run, which leads to the software application version which failed. In the pipeline run, focus is on changed configurations and software application version, certain log messages and parameters in log messages, as well as (logged) failure detection in a test software landscape, similar to failure detection in a production software landscape.

Data records are extracted (using the "extract filter"), and which have a high likelihood to contain relevant information. This is a very small subset of total available information of a pipeline run. On this subset, the focus is on aspects which changed compared to a previous run (for example, a changed configuration parameter, new version library of a parameter or a severity of a log message) using the "diff filter."

Configuration/Version

The described approach is provided access to used software application versions in a software application build, the software application configuration, and the pipeline configurations. The described approach can then identify changes in the data sets between two pipeline runs. Comparing a pipeline run which led to production software application deployment which failed and a previous pipeline run, can be used to determine changes, which might be a reason for the failure.

The identified records are considered as a "failure-indicator" (in the "configuration/version"). Since in current DevOps methodology with automated CI/CD pipelines, changes between two deployments are small, so a few records of changes (configuration/version) will be detected, providing a strong signal.

Turning to FIG. 1, FIG. 1 is a graph 100 illustrating a log comparison of pipeline urns between "Test" and "Prod," according to an implementation of the present disclosure.

Log Messages Comparing Pipeline Runs

The described approach is provided with logged or otherwise (for example, by monitoring) identified information on failures in a production software landscape and related logging/monitoring messages from test runs of the software application during the test step of the pipeline run. FIG. 1 at 102 and 104 illustrate a "Build 5.3" and a "Build 5.4," respectively. When a "failure" is identified in production (106) as a consequence of a pipeline run, filtered logs of the pipeline run are analyzed for differences between this pipeline run (that is, Build 5.4 104)) and a previous pipeline run (that is, Build 5.3, 102):

At 108, logs of the test step of the pipeline run are compared with logs of the test step of earlier pipeline runs.

Similarly, build and deploy-to-test logs can be compared with earlier runs of the pipeline.

The described approach scans for records of the filtered logs, which changed in the failed run (that is, Build 5.4, 104), compared to records of earlier successful runs (that is, Build 5.3, 102). Such identified records are considered as a "failure-indicator."

Log Messages Comparing Test and Production ("Prod").

Additionally, the described approach can compare log messages (for example, deploy and runtime) from two software landscapes (that is, test and prod) of the same application (for example, Build 5.4 104). Within the log files of a product with the same version in test and prod ("version vector of used building blocks"), the log messages with the same log message id are compared between the two landscapes (test and prod).

As an example for two scenarios that are searched: high severity in a production software landscape, lower severity in a test software landscape:

The message is rated with "error" in the production software landscape and is detected as rated with "warning" in the test software landscape.

The message is rated with "fatal" in the production software landscape and is detected as rated with "warning" or "error" in the test software landscape.

As part of the described approach, some failure-indicators can be identified where test severity could be increased (110). For example, in the prior example, a message detected as rated with "warning" or "error" in the test software landscape could be "increased" to also rate as "fatal" in the test software landscape.

Furthermore, in some implementations, certain log messages can be scanned, which contain statements regarding limited resources (for example, CPU or memory—searching for the key words in the logs). As an example, additionally, critical parameters written to the log can be compared between landscapes (for example, "% of memory consumed"):

such messages can be reported as, for example, "info" for a usage below 80% in test.

vs. a "warning" for "90% of memory consumed" or even out-of-memory situations in prod.

Other differences in log statements relevant for comparing application healthiness between landscapes might be more complex but could still be detectable applying modern natural language analysis algorithms.

In the described approach, the comparison of log data of Test and Prod can permit generation of insights for developers in at least two ways:

1. Using a data analysis, so that developers can view the data and assess, if changes to, for example, the log message severity, threshold levels, or test coverage should be applied:

Generate input for developers with selective log messages, which differ between Test and Prod and, for example, have a severity, such as, "error in prod" and "warning in test."

Extract relevant parameter(s) from log messages.

Compute a distribution of these parameters over runs of the pipeline (not only erroneous runs/runs resulting in production Failure).

2. Use the selected log messages and extracted parameters to train a ML model (112):

In some implementations, the ML model can be queried to assess test logs for indicators, that production will likely fail if a particular configuration is deployed to production (for example, after analyzing test logs for Build 5.4, 104 prior to deployment to production).

Failure—Failure-Indicator—Sets

With the previously described approach, two sets of Failure occurrences can be obtained with an identified Indicator ("Failure-Indicator-Set") for an application (Ax):

Failure-Indicator-Set-CV (Ax):

Error or fatal messages in a landscape and changes of configuration/version in the application build.

Failure-Indicator-Set-Log (Ax):

Error or fatal messages in a production landscape and warning or error messages in test landscape.

Both sets compare Test and Prod deployment of an application with a same version vector of used building blocks.

Identifying an Indicator in Other Applications

The Failure-Indicator combination can be used to monitor landscapes and CI/CD pipelines of other applications Ai for the same Indicator.

If a same Indicator (that is, same changes to configuration/version or the same log records) is found in a change or log of a test landscape of another application Ai (Indicator_i), it is considered identified, that the Indicator, which caused a Failure at application Ax has been found at Ai and can lead to the same Failure at Ai.

The software development team of Ai can now be notified that a performed change (Indicator_i) caused a Failure in another application Ax. In this way, investigation and/or mitigating actions can be taken in an attempt to avoid the possible Failure.

Identifying Solutions

Figure 2:
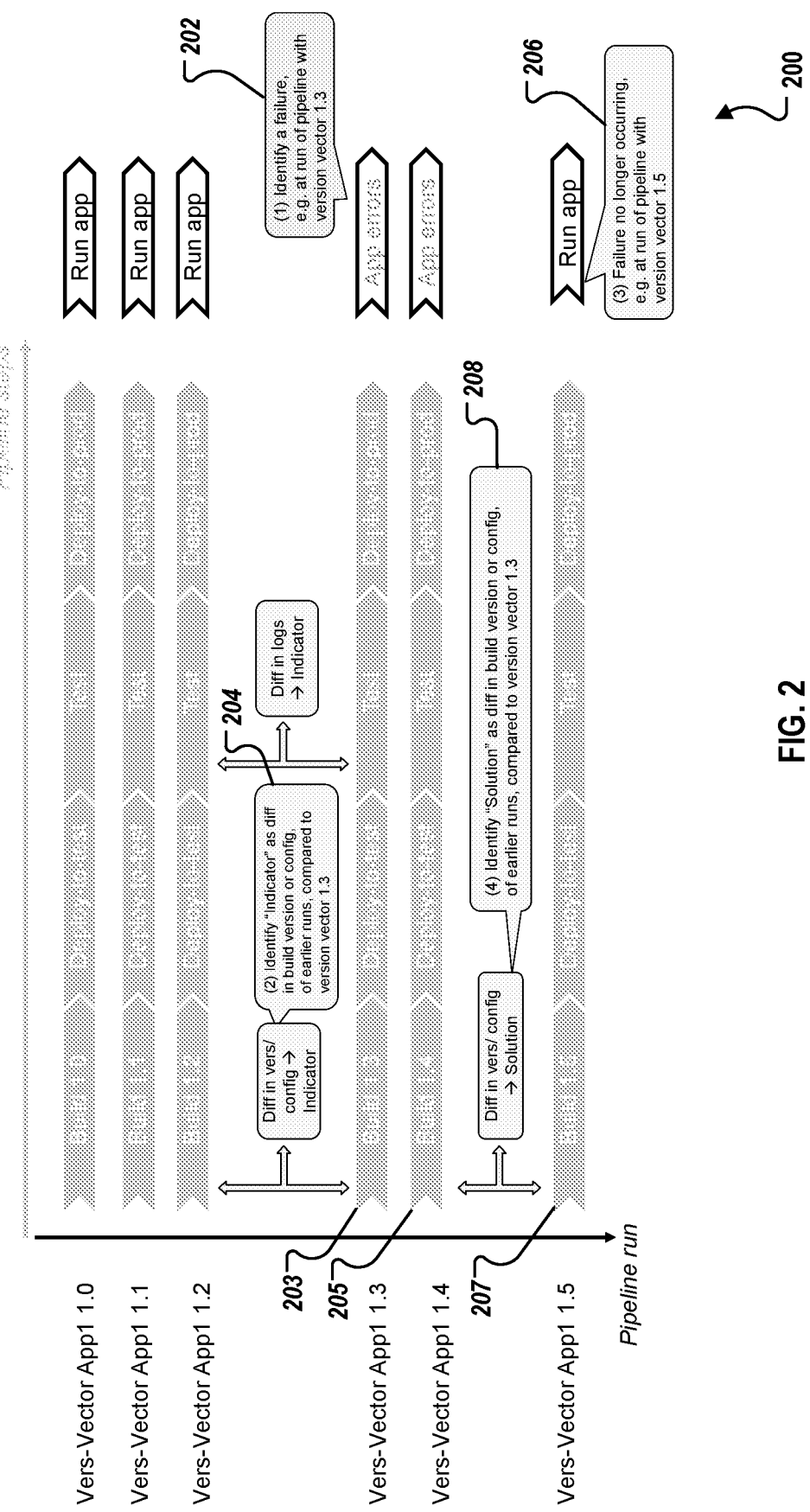
FIG. 2 is a graph illustrating identification of a "Failure-Indicator-Solution," according to an implementation of the present disclosure.

Turning to FIG. 2, FIG. 2 is a graph 200 illustrating identification of a "Failure-Indicator-Solution," according to an implementation of the present disclosure.

Continuing with the prior discussion, each Failure-Indicator in the two Failure-Indicator-Sets can be compared with a later run of the application Ax (higher version vector of the used building blocks), when the Failure has been corrected by the developers and the original error messages is no longer in the logs.

The deployment of a certain CI/CD run can be identified, after which the error message ("Failure") no longer occurs. For example, at 202, a Failure is detected at a run of the pipeline with version vector 1.3 (that is, Build 1.3, 203).

The respective change in (configuration/version) during build of the same CI/CD can be identified (if the Failure has been resolved by a change to configuration or version). For example, at 204, the "indicator" if identified as a diff in a build version or configuration of earlier runs compared to version vector 1.3. Note that version vector 1.4 (that is, Build 1.4, 205) also indicates "App errors" as in version vector 1.3, Build 1.3, 203).

If such a change in (configuration/version) is detected, this is a strong indicator for solving the original Failure: this change is a "Solution" indicator. For example, at 206, and version vector 1.5 (that is, Build 1.5, 207), the Failure is no longer occurring.

One thus has a Failure-Indicator set at Ax with a Solution at Ax at a later point in time: A "Failure-Indicator-Solution" combination. For example, at 208, a difference in a version/configuration compared to version vector 1.3 (that is, Build 1.3, 203) is identified as a Solution.

Identifying an Indicator in Other Applications and Recommending a Solution

Figure 3:
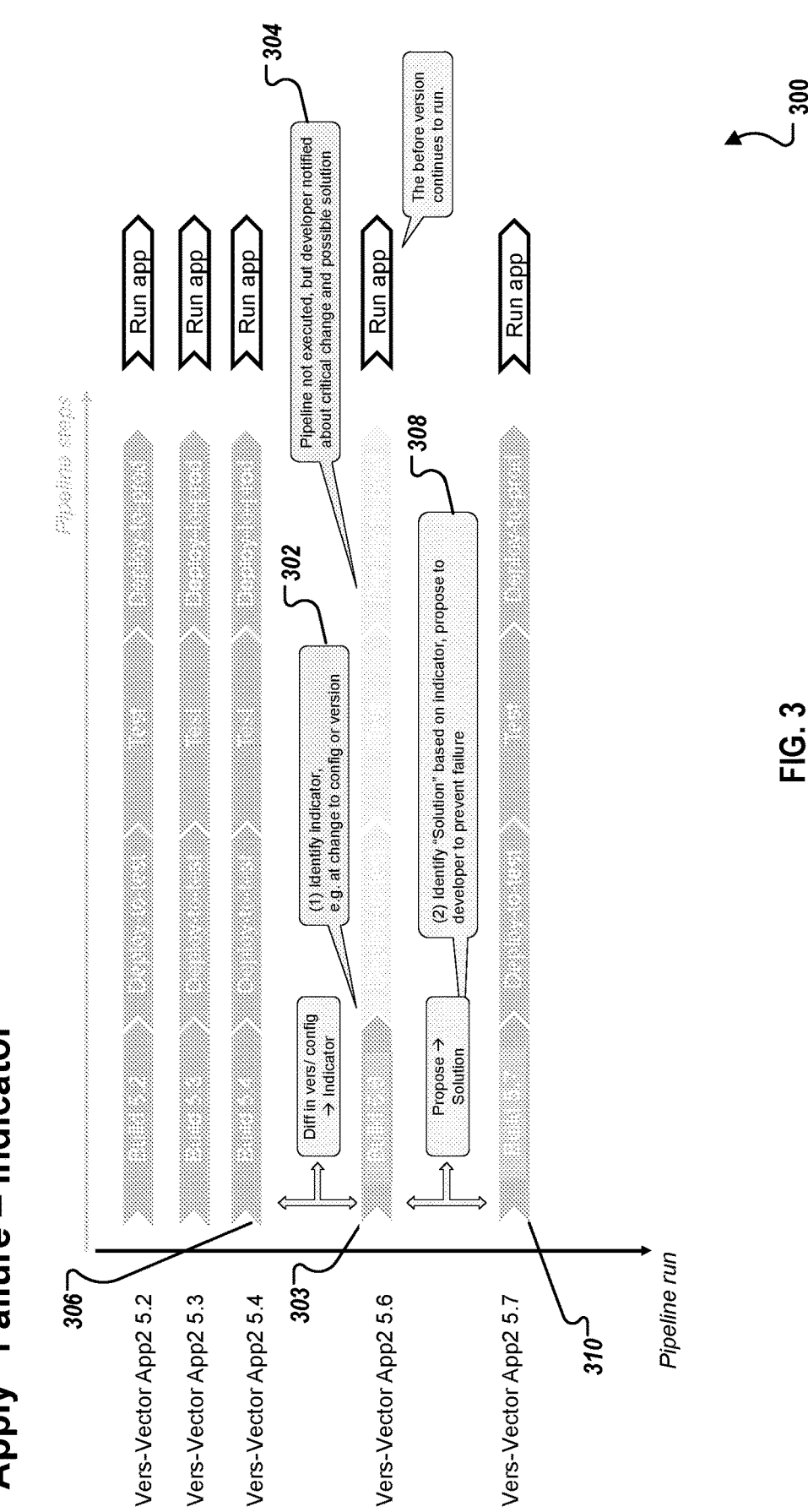
FIG. 3 is a graph illustrating applying a "Failure-Indicator," according to in implementation of the present disclosure.

Turning to FIG. 3, FIG. 3 is a graph 300 illustrating applying a "Failure-Indicator," according to in implementation of the present disclosure.

The Failure-Indicator-Solution combination can be used to monitor software landscapes and CI/CD pipelines of other applications Ai for a same Failure-Indicator. When one has a Failure-Indicator-Solution combination (as in FIG. 2), not only the Failure-Indicator can be reported (as previously described), but a Solution can be recommended.

If a same Indicator (Indicator_x) (same changes to (configuration/version) or same log records) is found in a change or test landscape of another application Ai (Indicator_i), the Indicator (Indicator_x) which caused a Failure at application Ax has been found at Ai and can lead to the same Failure at Ai. For example, at 302, an indicator from a prior determination is identified with respect to Build 5.6, 303.

The development team of Ai can now be notified that the change (Indicator_i) caused a Failure in another application Ax. For example, at 304, the pipeline for Build 5.6 303 is not run, but build 5.4, 306 continues to run instead.

Additionally, the development team could be informed about the Failure-Indicator-Solution combination, with a description of changes in their application (Indicator_i) and a description of changes and logs of the Failure-Indicator-Solution combination of Ax. For example, at 308, a Solution is identified based on the indicator and proposed to the developer.

The development team can then analyze to determine if the change that caused the other application to fail is a risk and correct/mitigate a possible future Failure, eventually with the Solution found by the development team of Ax. For example, in Build 5.7 (310), the development team can incorporate changes (Solution) to correct/mitigate the identified Indicator at 302 and run Build 5.7 (310).

These techniques can be used on small setup with few pipelines and products. Another possible use case is to quickly react on newly found failure-incident combinations, where one would lose time, until the new occurrences are incorporated us training into a new ML model.

ML Model Training

To train a ML model, data records are collected based on an analysis run to find Failure-Indicator and Failure-Indicator-Solution sets. If a data record is found in the context of any Failure-Indicator or Failure-Indicator-Solution set, the data record is taken to filter the input. The idea is to collect for all pipeline runs a superset of data records, which occurred in each of the analysis as "failure," "indicator," and "solution."

Figures 4A, 4B:
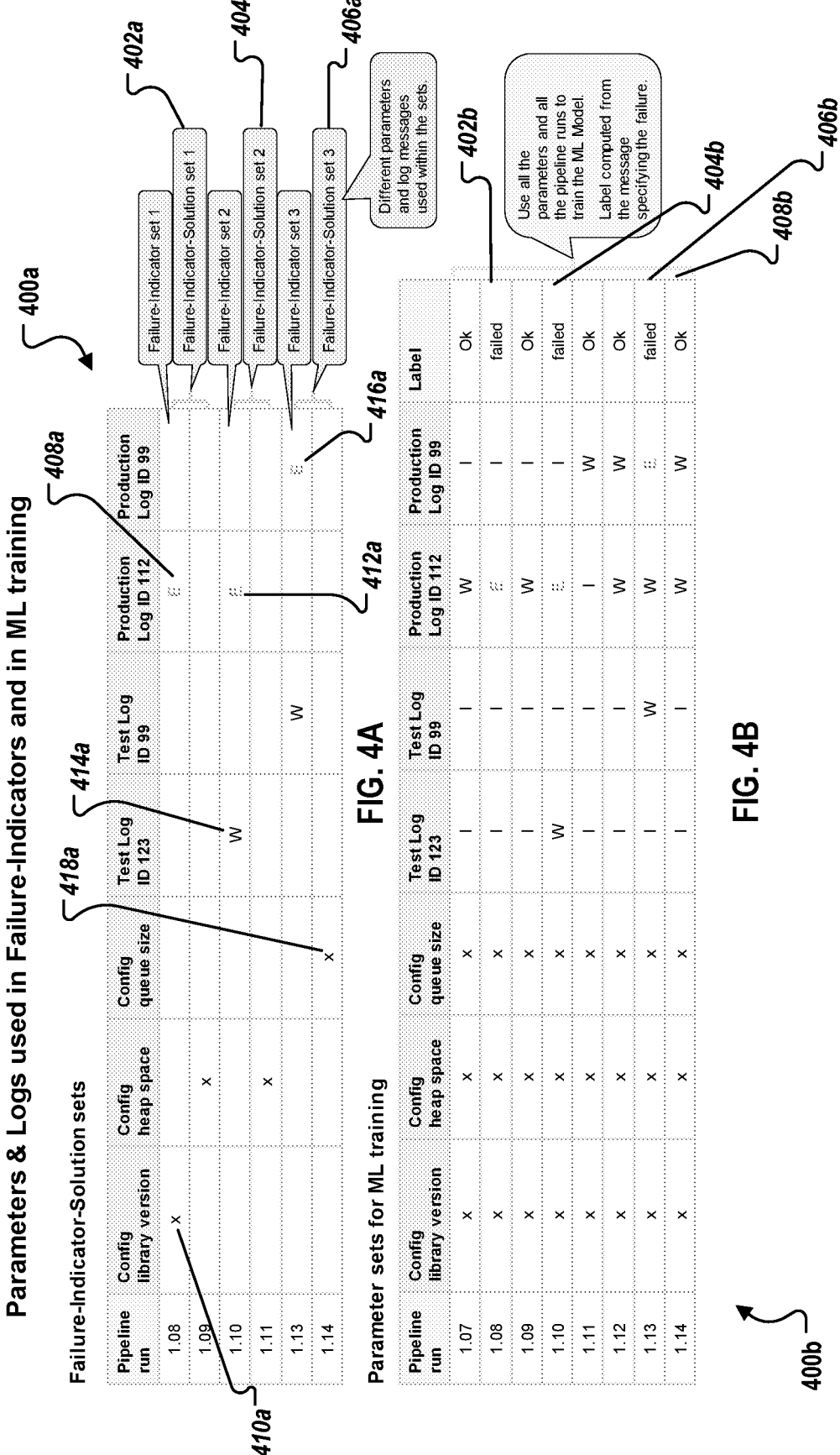
FIG. 4A is a table illustrating three Failure-Indicator sets, according to an implementation of the present disclosure.
FIG. 4B is a table illustrating Parameter sets for machine learning (ML) training, according to an implementation of the present disclosure.

Turning to FIG. 4A, FIG. 4A is a table 400a illustrating three Failure-Indicator sets, according to an implementation of the present disclosure. In FIG. 4A:

Failure-Indicator Solution set 1 (402a):
Failure: Message at prod (408a) with ID 112 "out-of-memory" and severity "critical".
Indicator: Changed version of used library (410a) "magic-pacman-player."
Solution: Increased setting of parameter "heap-space" in config file "container-pacman-player.json."
Failure-Indicator Solution set 2 (404a):
Failure: Message at prod (412a) with ID 112 "out-of-memory" and severity "critical."
Indicator: Message at test (414a) with ID 123 "memory-usage" and severity "warning."
Solution: Increased setting of parameter "heap-space" in config file "container-pacman-player.json."
Failure-Indicator Solution set 3 (406a):
Failure: Message at prod (416a) with ID 99 "message queue overflow" and severity "critical."
Indicator: Message at test (418a) with ID 99 "message queue overflow" and severity "warning."
Solution: Increased setting of parameter "queue-size" in config file "player-queue.json."
The superset of data records to take from each pipeline run would thus be:
Prod:
Message at prod with ID 112 "out-of-memory" and severity "critical."
Message at prod with ID 99 "message queue overflow" and severity "critical."
Test:
Message at test with ID 123 "memory-usage" and severity "warning."
Message at test with ID 99 "message queue overflow" and severity "warning."
Config/Version:
Changed version of used library "magic-pacman-player."
Changed setting of parameter "heap-space" in config file "container-pacman-player.json."
Changed setting of parameter "queue-size" in config file "player-queue.json."

Turning to FIG. 4B, FIG. 4B is a table 400b illustrating Parameter sets for machine learning (ML) training, according to an implementation of the present disclosure.

For each pipeline run (for example, at least those illustrated in FIG. 4A), more records are collected than had been used in a single "Failure-Indicator" set, but every parameter which occurred in a "Failure-Indicator" set is then contained in the data set. This results in a data set of n parameters and a label "ok" or "failed" for each pipeline run. In FIG. 4B, 'W', 'I', and 'E' refer to "Warning," "Information," and "Error," respectively.

If any of the data records indicating the failure is part of the pipeline run data set, the set is labeled as "failed." For example, Parameter sets for ML training 402b, 404b, and 406b, correspond to Failure-Indicator sets 402a, 404a, and 406a in FIG. 4A

And as "ok" if none of these are found (for example, Parameter set for ML training 408b).

The data set of parameters and labels is passed to ML training.

If a ML model is created with appropriate accuracy, the ML model can be used during the run of a pipeline:
From a build step, changed parameters can be extracted.
From a test run step, identified log messages are extracted.
The parameters are passed to the ML model to derive if the production is predicted (a certain accuracy and error) to fail with the run or not.
If the ML model returns an increased likelihood that the production run will fail, the deploy to prod step is suspended and the developer team is notified about the reported likelihood.

With respect to the training data, once parameters or log messages have been identified as relevant, they will be included in data sets fed to ML. In FIG. 4B, the 'x''s present in the three columns to the right of the Pipeline run" column for the row designated by 406b indicate that there was once a situation where error message ID 99 was relevant (that is, "Config library version, Config heap space, and Config queue size), so the presence/values are included in a data set(s) given to ML. In most build instances, a message will be empty (that is, not present) or the value will be a good value, and if this is paired with "no problem," then the ML can learn this relation. When in one data set the message occurs (or a config param is changed), and this is paired with a failure (or a solution after a failure), then the correct data is included in the learning and ML will then detect this relation.

Figure 5:
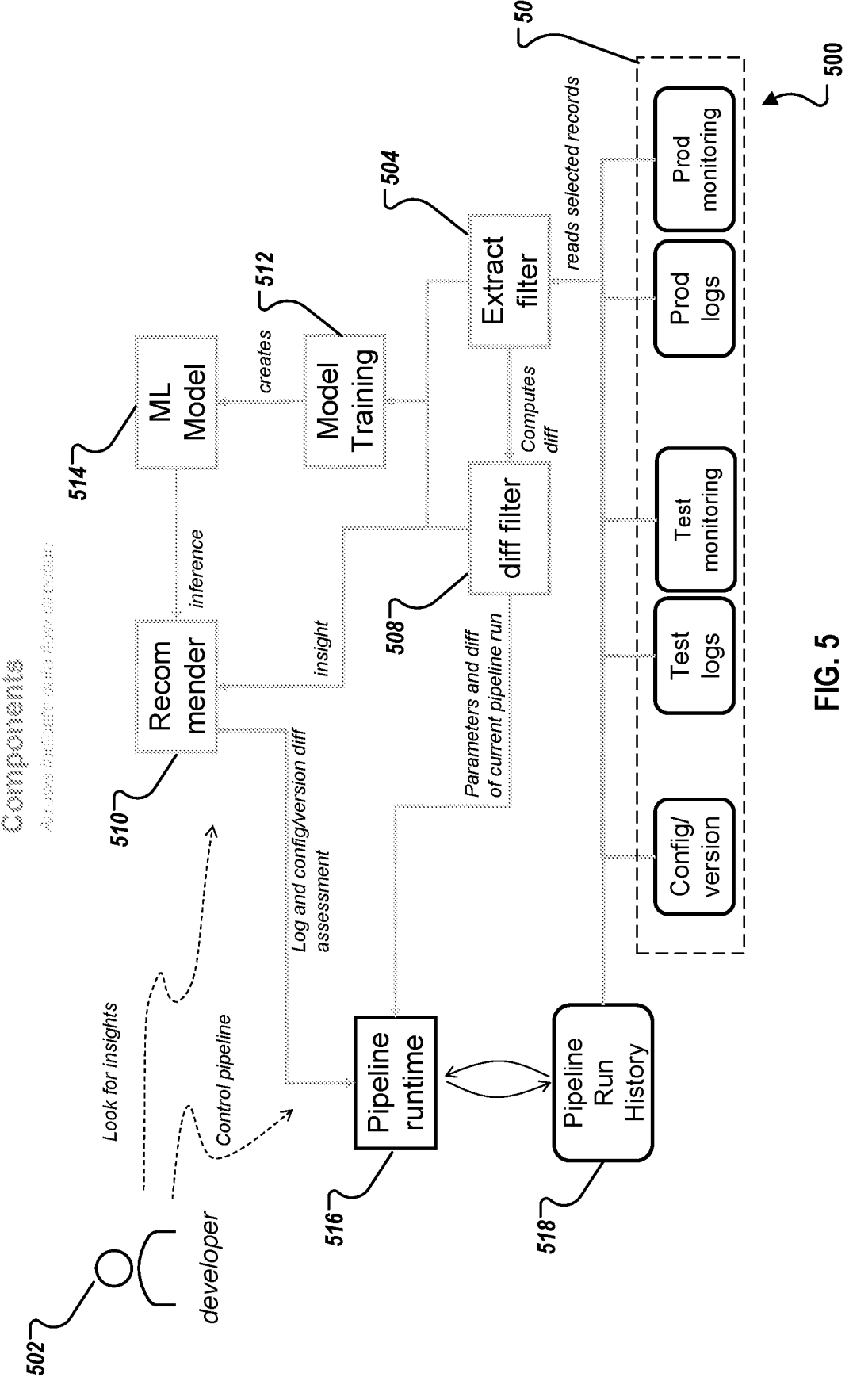
FIG. 5 is a block diagram illustrating components of the described approach, according to in implementation of the present disclosure.

Turning to FIG. 5, FIG. 5 is a block diagram 500 illustrating components of the described approach, according to in implementation of the present disclosure.

A developer 502 looks for insights and to control a pipeline using the described approach.

The Extract filter 504 can be configured to extract certain parameters and log messages from various records 506—at a high-level—product configuration, build versions, log messages and monitoring data (for example, alerts) of test runs and of production systems). In particular, and in some implementations, 506 can include config/version, test logs, test monitoring, Prod logs, and Prod monitoring.

The Diff filter 508 can compute a difference between extracted records compared with an earlier run of a pipeline.

The Recommender 510 (for example, a recommendation software engine/application) can run a model training 512 process with the data from the Diff filter 508. The Recommender 510 can re-run the model training 512 process recurringly (for example, after a specified number of pipeline runs). The Recommender 510 can query a ML model

514 with a set of parameters. The Recommender 510 can be queried by the Developer 502 for insights regarding the ML model 514 or data passed through the Extract filter 504 and Diff filter 508.

The Pipeline runtime 516 can use the Extract filter 504 and Diff filter 508, to read a set of parameters and log messages from product configurations, build versions, and/ or log messages of test runs (for example, 506). The Pipeline runtime 516 can compute a difference between extracted records when compared with an earlier run of a pipeline (for example, using a Pipeline Run History 518). The Pipeline runtime 516 can call the Recommender 510 with a set of parameters obtained using the Extract filter 501/Diff filter 508. The Recommender 510 can stop a pipeline run and notify developers (for example, on a development team) about expected problems with the current pipeline run.

To enhance understanding, a pipeline example using a new library version requiring more memory during runtime can include:

The new library version needs more memory and needs to be configured in the runtime setup. If this is not known to developers, a change in library version can lead to an error message in a production system (for example, an "out-of-memory" error can occur (oom-message, either in logs or detected by runtime monitoring).

If this failure is observed with the described approach, the approach will check the changes in build and test logs and will identify that the library version changed. If other teams change the library version as well, the system can identify the change and point to the potential problem with an out-of-memory condition.

In some implementations, the example can be extended. For example, there might be a memory warning in Test, already suggesting a memory problem, but easily overseen as it is only logged as a warning and not causing an error (because a "fatal" error only occurs under higher load in Production). The memory error in Production and warning in Test can be identified and developers can be notified, about this correlation. Developers can then decide to modify the memory threshold or severity of the message in Test for an earlier alerting.

As an even further extended example, in a subsequent run of the pipeline (after the library version had been changed), Developers extend a memory configuration of a runtime setup. This pipeline run deploys a production version which does not run into errors any longer. The system identifies that a change in configuration resolved the problem in production. The configuration change is identified as a "solution." Other teams can, therefore, not only be notified about the problem with the increased library version, but also be notified, that a memory configuration change resolved the problem for another team.

FIG. 6 is a flowchart illustrating an example of a computer-implemented method 600 for intelligent DevOps recommendation of insights across software applications and landscapes, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, to create extracted data records, an extract filter is instructed to extract relevant data records from log messages of two runs of a software pipeline. In some implementations, the relevant data records include deployed software application versions and components, error messages, and status information of extracted tasks. In some implementations, the software pipeline includes deploy, test, and production. From 602, method 600 proceeds to 604.

At 604, to create diff records using the extracted data records, instructing a diff filter to compare and identify differences in messages between the two runs of a software pipeline, wherein the diff records are amended with labeled data status information of the pipeline run the records have been taken from. From 604, method 600 proceeds to 606.

At 606, a recommendation engine is instructed to execute a machine-learning model training with the diff records. In some implementations, the recommendation engine can be instructed to re-execute the machine-learning model training after a specified number of software pipeline runs. From 606, method 600 proceeds to 608.

At 608, using the diff records, calling the recommendation engine to analyze the diff records for a failure-indicator. From 608, method 600 proceeds to 610.

At 610, based on a later run of the software pipeline, determining that a failure causing the failure-indicator has been corrected. From 610, method 600 proceeds to 612.

At 612, a change in configuration or version of a software application associated with a correction is identified. From 612, method 600 proceeds to 614.

At 614, a failure-indicator-solution combination is generated. In some implementations, upon detection of a same failure-indicator in a different software pipeline execution, a notification of the same failure-indicator is generated and, using the failure-indicator-solution combination, a recommended solution to the same failure-indicator is recommended. In some implementations, using the failure-indicator, landscapes and software pipelines of other software applications can be monitored for a same failure-indicator. Upon detection of the same failure-indicator in landscapes and software pipelines of other software applications, a notification of the same failure-indicator is generated and, using the failure-indicator-solution combination, a recommended solution to the same failure-indicator is recommended. After 614, method 600 can stop.

Figure 7:
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, computer-implemented system 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702. The Database 706 can hold and operate on at least any data type mentioned or any data type consistent with this disclosure.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method, comprising: instructing, to create extracted data records, an extract filter to extract relevant data records from log messages of two runs of a software pipeline; instructing, to create diff records using the extracted data records, a diff filter to compare and identify differences in messages between the two runs of a software pipeline, wherein the diff records are amended with labeled data status information of a software pipeline run the extracted data records have been taken from; instructing a recommendation engine to execute a machine-learning model training with the diff records; calling, using the diff records, the recommendation engine to analyze the diff records for a failure-indicator; determining, based on a later run of the software pipeline, that a failure causing the failure-indicator has been corrected; identifying a change in a configuration or version of a software application associated with a correction; and generating a failure-indicator-solution combination.

The foregoing and other described implementations can each, optionally, include one or more of the following features:

A first feature, combinable with any of the following features, wherein the relevant data records include deployed software application versions and components, error messages, and status information of extracted tasks.

A second feature, combinable with any of the previous or following features, wherein the software pipeline includes deploy, test, and production.

A third feature, combinable with any of the previous or following features, comprising: generating, upon detection of a same failure-indicator in a different software pipeline execution, a notification of the same failure-indicator; and recommending, using the failure-indicator-solution combination, a recommended solution to the same failure-indicator.

A fourth feature, combinable with any of the previous or following features, comprising: monitoring, using the failure-indicator, landscapes, and software pipelines of other software applications for a same failure-indicator.

A fifth feature, combinable with any of the previous or following features, comprising: generating, upon detection of the same failure-indicator in landscapes and software pipelines of other software applications, a notification of the same failure-indicator; and recommending, using the failure-indicator-solution combination, a recommended solution to the same failure-indicator.

A sixth feature, combinable with any of the previous or following features, comprising: instructing the recommendation engine to re-execute the machine-learning model training after a specified number of software pipeline runs.

In a second implementation, a non-transitory, computer-readable medium storing one or more instructions executable by a computer system to perform one or more operations, comprising: instructing, to create extracted data records, an extract filter to extract relevant data records from log messages of two runs of a software pipeline; instructing, to create diff records using the extracted data records, a diff filter to compare and identify differences in messages between the two runs of a software pipeline, wherein the diff records are amended with labeled data status information of a software pipeline run the extracted data records have been taken from; instructing a recommendation engine to execute a machine-learning model training with the diff records; calling, using the diff records, the recommendation engine to analyze the diff records for a failure-indicator; determining, based on a later run of the software pipeline, that a failure causing the failure-indicator has been corrected; identifying a change in a configuration or version of a software application associated with a correction; and generating a failure-indicator-solution combination.

The foregoing and other described implementations can each, optionally, include one or more of the following features:

A first feature, combinable with any of the following features, wherein the relevant data records include deployed software application versions and components, error messages, and status information of extracted tasks.

A second feature, combinable with any of the previous or following features, wherein the software pipeline includes deploy, test, and production.

A third feature, combinable with any of the previous or following features, comprising: generating, upon detection of a same failure-indicator in a different software pipeline execution, a notification of the same failure-indicator; and recommending, using the failure-indicator-solution combination, a recommended solution to the same failure-indicator.

A fourth feature, combinable with any of the previous or following features, comprising: monitoring, using the failure-indicator, landscapes, and software pipelines of other software applications for a same failure-indicator.

A fifth feature, combinable with any of the previous or following features, comprising: generating, upon detection of the same failure-indicator in landscapes and software pipelines of other software applications, a notification of the same failure-indicator; and recommending, using the failure-indicator-solution combination, a recommended solution to the same failure-indicator.

A sixth feature, combinable with any of the previous or following features, comprising: instructing the recommendation engine to re-execute the machine-learning model training after a specified number of software pipeline runs.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: instructing, to create extracted data records, an extract filter to extract relevant data records from log messages of two runs of a software pipeline; instructing, to create diff records using the extracted data records, a diff filter to compare and identify differences in messages between the two runs of a software pipeline, wherein the diff records are amended with labeled data status information of a software pipeline run the extracted data records have been taken from; instructing a recommendation engine to execute a machine-learning model training with the diff records; calling, using the diff records, the recommendation engine to analyze the diff records for a failure-indicator; determining, based on a later run of the software pipeline, that a failure causing the failure-indicator has been corrected; identifying a change in a configuration or version of a software application associated with a correction; and generating a failure-indicator-solution combination.

The foregoing and other described implementations can each, optionally, include one or more of the following features:

A first feature, combinable with any of the following features, wherein the relevant data records include deployed software application versions and components, error messages, and status information of extracted tasks.

A second feature, combinable with any of the previous or following features, wherein the software pipeline includes deploy, test, and production.

A third feature, combinable with any of the previous or following features, comprising: generating, upon detection of a same failure-indicator in a different software pipeline execution, a notification of the same failure-indicator; and recommending, using the failure-indicator-solution combination, a recommended solution to the same failure-indicator.

A fourth feature, combinable with any of the previous or following features, comprising: monitoring, using the failure-indicator, landscapes, and software pipelines of other software applications for a same failure-indicator.

A fifth feature, combinable with any of the previous or following features, comprising: generating, upon detection of the same failure-indicator in landscapes and software pipelines of other software applications, a notification of the same failure-indicator; and recommending, using the failure-indicator-solution combination, a recommended solution to the same failure-indicator.

A sixth feature, combinable with any of the previous or following features, comprising: instructing the recommendation engine to re-execute the machine-learning model training after a specified number of software pipeline runs.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
instructing, to create extracted data records, an extract filter to extract relevant data records from log messages of two runs of a software pipeline;
instructing, to create diff records using the extracted data records, a diff filter to compare and identify differences in messages between the two runs of a software pipeline, wherein the diff records are amended with labeled data status information of a software pipeline run the extracted data records have been taken from;

instructing a recommendation engine to execute a machine-learning model training with the diff records;
calling, using the diff records, the recommendation engine to analyze the diff records for a failure-indicator, wherein the failure-indicator is identified as one or more of alerts in log messages of a production software landscape, crash dump recordings, service downtime, service degradation, or alerting events;
scanning, using the machine-learning model and from a set of pipeline runs of concurrently executing different software products, use of the failure-indicator of the software pipeline for a solution-indicator-parameter;
determining, based on the analysis and a later run of the software pipeline, that a failure causing the failure-indicator has been corrected;
identifying a change in a configuration or version of a software application associated with a correction;
generating a failure-indicator-solution combination; and
determining automatically during a later run of the software pipeline, suspending deployment of the software application if the machine-learning model returns an increased likelihood execution of the software application for failures.

2. The computer-implemented method of claim 1, wherein the relevant data records include deployed software application versions and components, error messages, and status information of extracted tasks.

3. The computer-implemented method of claim 1, wherein the software pipeline includes deploy, test, and production.

4. The computer-implemented method of claim 1, comprising:
generating, upon detection of a same failure-indicator in a different software pipeline execution, a notification of the same failure-indicator; and
recommending, using the failure-indicator-solution combination, a recommended solution to the same failure-indicator.

5. The computer-implemented method of claim 1, comprising:
monitoring, using the failure-indicator, landscapes, and software pipelines of other software applications for a same failure-indicator.

6. The computer-implemented method of claim 5, comprising:
generating, upon detection of the same failure-indicator in landscapes and software pipelines of other software applications, a notification of the same failure-indicator; and
recommending, using the failure-indicator-solution combination, a recommended solution to the same failure-indicator.

7. The computer-implemented method of claim 1, comprising:
instructing the recommendation engine to re-execute the machine-learning model training after a specified number of software pipeline runs.

8. A non-transitory, computer-readable medium storing one or more instructions executable by a computer system to perform one or more operations, comprising:
instructing, to create extracted data records, an extract filter to extract relevant data records from log messages of two runs of a software pipeline;
instructing, to create diff records using the extracted data records, a diff filter to compare and identify differences in messages between the two runs of a software pipeline, wherein the diff records are amended with labeled data status information of a software pipeline run the extracted data records have been taken from;

instructing a recommendation engine to execute a machine-learning model training with the diff records;

calling, using the diff records, the recommendation engine to analyze the diff records for a failure-indicator, wherein the failure-indicator is identified as one or more of alerts in log messages of a production software landscape, crash dump recordings, service downtime, service degradation, or alerting events;

scanning, using the machine-learning model and from a set of pipeline runs of concurrently executing different software products, use of the failure-indicator of the software pipeline for a solution-indicator-parameter;

determining, based on the analysis and a later run of the software pipeline, that a failure causing the failure-indicator has been corrected;

identifying a change in a configuration or version of a software application associated with a correction;

generating a failure-indicator-solution combination; and determining automatically during a later run of the software pipeline, suspending deployment of the software application if the machine-learning model returns an increased likelihood execution of the software application for failures.

9. The non-transitory, computer-readable medium of claim 8, wherein the relevant data records include deployed software application versions and components, error messages, and status information of extracted tasks.

10. The non-transitory, computer-readable medium of claim 8, wherein the software pipeline includes deploy, test, and production.

11. The non-transitory, computer-readable medium of claim 8, comprising:

generating, upon detection of a same failure-indicator in a different software pipeline execution, a notification of the same failure-indicator; and recommending, using the failure-indicator-solution combination, a recommended solution to the same failure-indicator.

12. The non-transitory, computer-readable medium of claim 8, comprising:

monitoring, using the failure-indicator, landscapes, and software pipelines of other software applications for a same failure-indicator.

13. The non-transitory, computer-readable medium of claim 12, comprising:

generating, upon detection of the same failure-indicator in landscapes and software pipelines of other software applications, a notification of the same failure-indicator; and recommending, using the failure-indicator-solution combination, a recommended solution to the same failure-indicator.

14. The non-transitory, computer-readable medium of claim 8, comprising:

instructing the recommendation engine to re-execute the machine-learning model training after a specified number of software pipeline runs.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

instructing, to create extracted data records, an extract filter to extract relevant data records from log messages of two runs of a software pipeline;

instructing, to create diff records using the extracted data records, a diff filter to compare and identify differences in messages between the two runs of a software pipeline, wherein the diff records are amended with labeled data status information of a software pipeline run the extracted data records have been taken from;

instructing a recommendation engine to execute a machine-learning model training with the diff records;

calling, using the diff records, the recommendation engine to analyze the diff records for a failure-indicator, wherein the failure-indicator is identified as one or more of alerts in log messages of a production software landscape, crash dump recordings, service downtime, service degradation, or alerting events;

scanning, using the machine-learning model and from a set of pipeline runs of concurrently executing different software products, use of the failure-indicator of the software pipeline for a solution-indicator-parameter;

determining, based on the analysis and a later run of the software pipeline, that a failure causing the failure-indicator has been corrected;

identifying a change in a configuration or version of a software application associated with a correction;

generating a failure-indicator-solution combination; and determining automatically during a later run of the software pipeline, suspending deployment of the software application if the machine-learning model returns an increased likelihood execution of the software application for failures.

16. The computer-implemented system of claim 15, wherein the relevant data records include deployed software application versions and components, error messages, and status information of extracted tasks.

17. The computer-implemented system of claim 15, wherein the software pipeline includes deploy, test, and production.

18. The computer-implemented system of claim 15, comprising:

generating, upon detection of a same failure-indicator in a different software pipeline execution, a notification of the same failure-indicator; and recommending, using the failure-indicator-solution combination, a recommended solution to the same failure-indicator.

19. The computer-implemented system of claim 15, comprising:

monitoring, using the failure-indicator, landscapes, and software pipelines of other software applications for a same failure-indicator.

20. The computer-implemented system of claim 19, comprising:

generating, upon detection of the same failure-indicator in landscapes and software pipelines of other software applications, a notification of the same failure-indicator; and recommending, using the failure-indicator-solution combination, a recommended solution to the same failure-indicator.

* * * * *